J. L. PIERCE.
FURNACE AND EVAPORATOR.
APPLICATION FILED FEB. 17, 1916.

1,228,240.

Patented May 29, 1917.
4 SHEETS—SHEET 1.

WITNESSES

INVENTOR
James L. Pierce
BY
ATTORNEYS

J. L. PIERCE.
FURNACE AND EVAPORATOR.
APPLICATION FILED FEB. 17, 1916.
1,228,240.
Patented May 29, 1917.
4 SHEETS—SHEET 2.
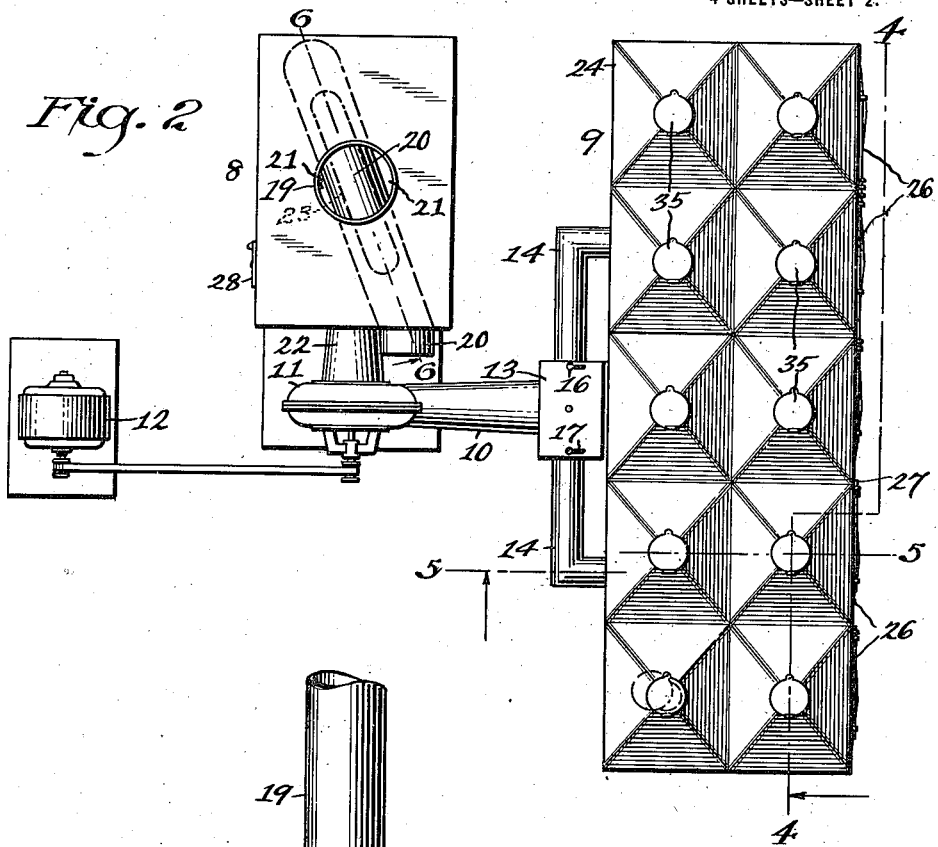
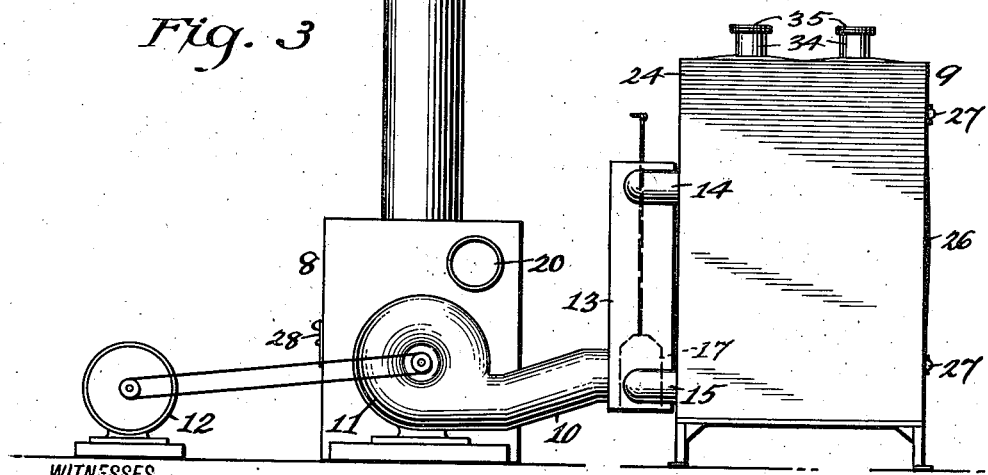
WITNESSES
INVENTOR
James L. Pierce
BY
ATTORNEYS

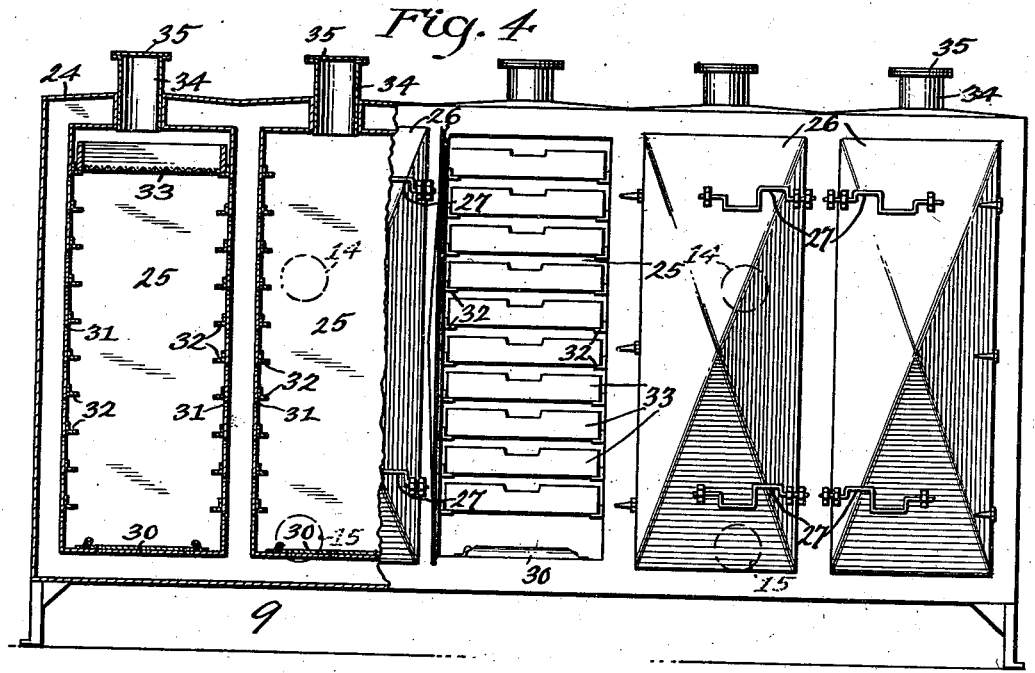
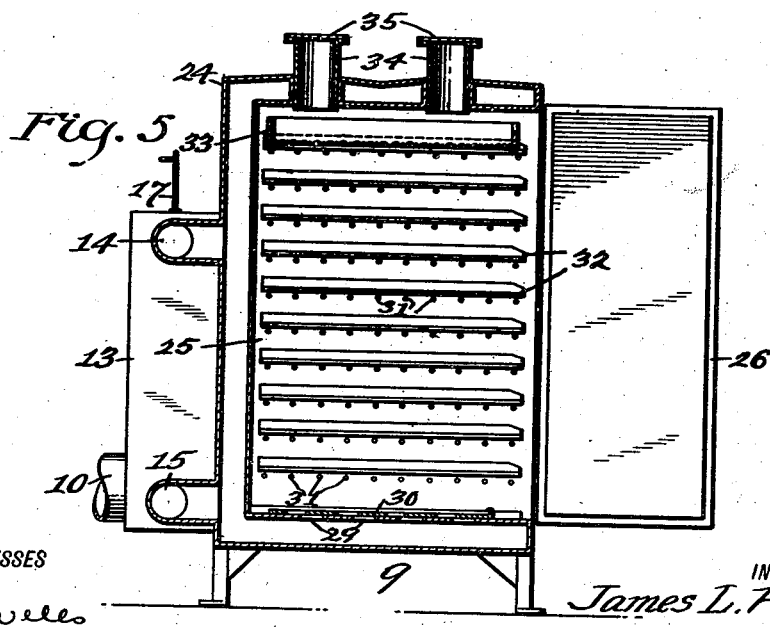

J. L. PIERCE.
FURNACE AND EVAPORATOR.
APPLICATION FILED FEB. 17, 1916.

1,228,240.

Patented May 29, 1917.
4 SHEETS—SHEET 4.

WITNESSES

INVENTOR
James L. Pierce
BY
ATTORNEYS

UNITED STATES PATENT OFFICE.

JAMES LOUIS PIERCE, OF MANILA, PHILIPPINE ISLANDS.

FURNACE AND EVAPORATOR.

1,228,240.  Specification of Letters Patent.  Patented May 29, 1917.

Application filed February 17, 1916. Serial No. 78,896.

*To all whom it may concern:*

Be it known that I, JAMES L. PIERCE, a citizen of the United States, and a resident of Manila, in the Philippine Islands, have invented certain new and useful Improvements in Furnaces and Evaporators, of which the following is a specification.

My invention relates to means for use primarily in the drying of copra, but which may be used for evaporating fruit, vegetables, and the like, and the main object is to provide a container for the matter being evaporated, means for heating air, readily controlled means for delivering the heated air to said container in such manner as to prevent the flames of the air heater from reaching said container, and a plurality of separately removable trays for the matter being evaporated in each of a plurality of separate compartments, all of which are in operative connection with the heated air supply.

My invention is fully described in the following specification, of which the accompanying drawings form a part, in which like characters refer to like parts in each of the views, and in which:—

Fig. 2 is a top plan view thereof;

Fig. 3 is an end view thereof;

Fig. 4 is a section taken on the line 4—4 of Fig. 2;

Fig. 5 is a section taken on the line 5—5 of Fig. 2;

Figure 1:
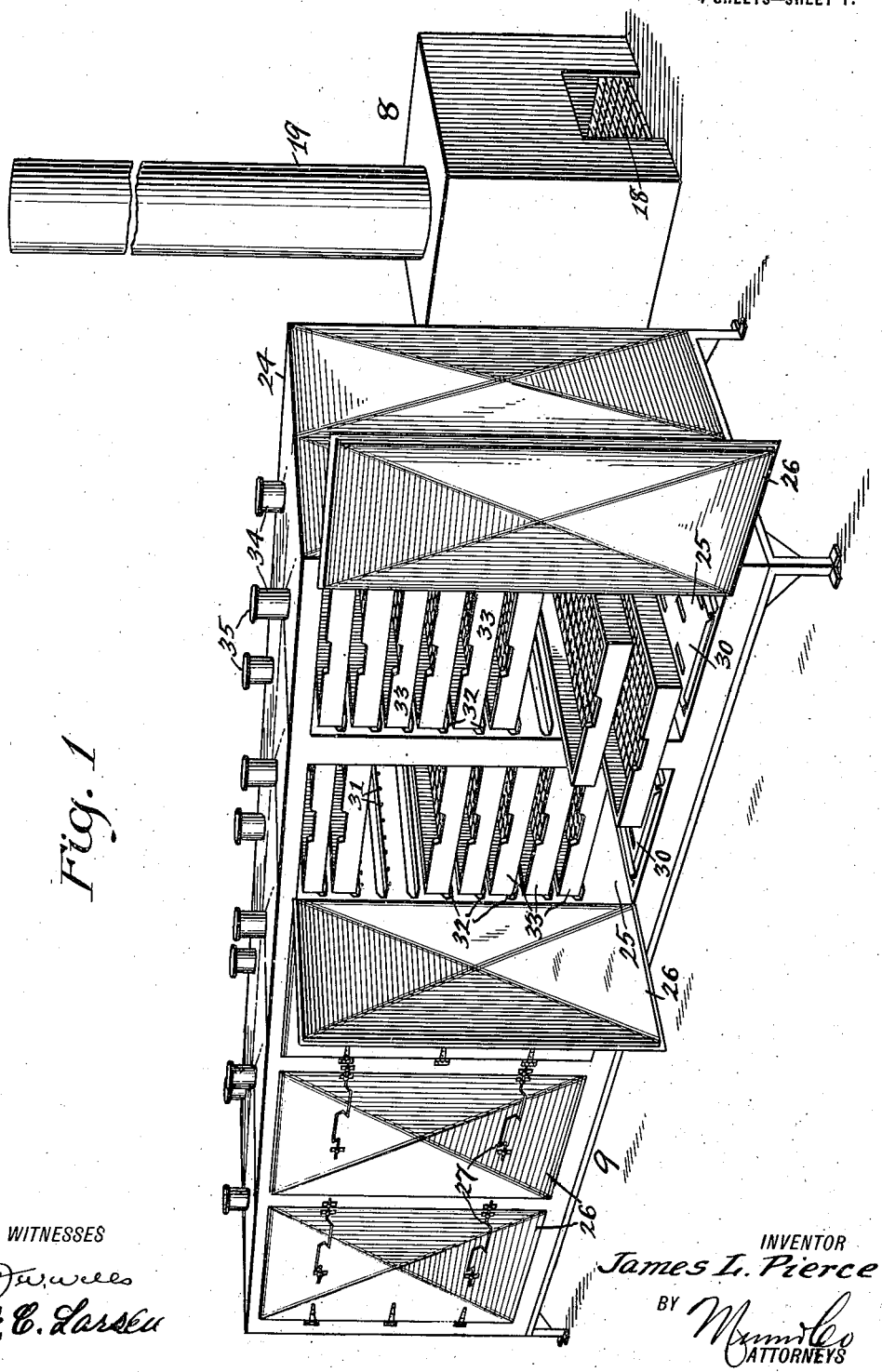
Figure 1 is a perspective view of my apparatus ready for use, two compartments being shown open.

In the drawings forming a part of this application I have shown a furnace 8 and an evaporator 9 connected by a pipe 10 through a blower 11 operated by a motor 12, said pipe leading into a mixing chamber 13, on the rear of the evaporator 9 and thence, through branches 14 and 15, to said evaporator, suitable dampers 16 and 17 being provided for said branches.

Figure 6:
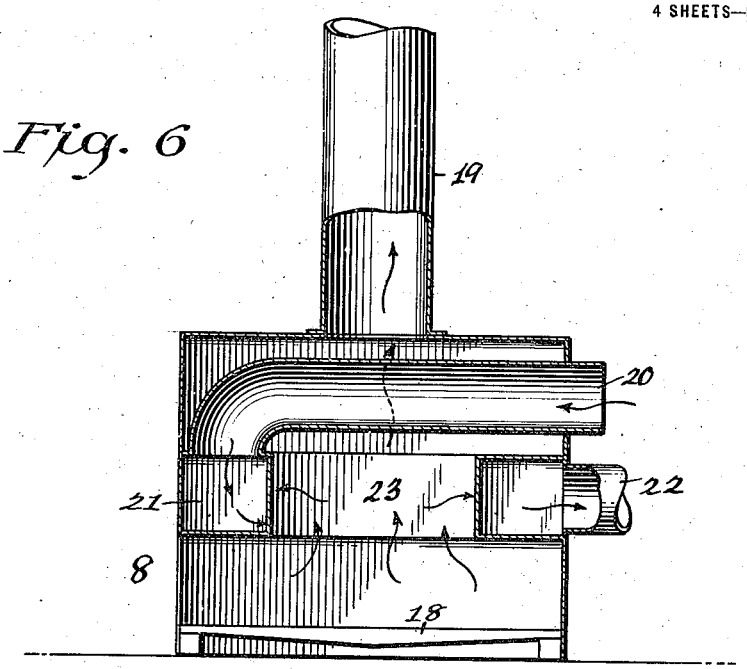
Fig. 6 is a section taken on the line 6—6 of Fig. 2.

The furnace 8, as shown in Fig. 6, has a grate 18 preferably, though not necessarily, designed to burn the husks and shells of cocoanuts, a stack 19 for the escape of smoke, an air inlet pipe 20, and an air heating chamber 21 to which the inlet pipe 20 leads and which communicates with the pipe 10 by means of a pipe 22, said chamber having a passage 23 arranged vertically therethrough to permit the passage of the products of combustion from the grate to the stack 19.

Figure 7:
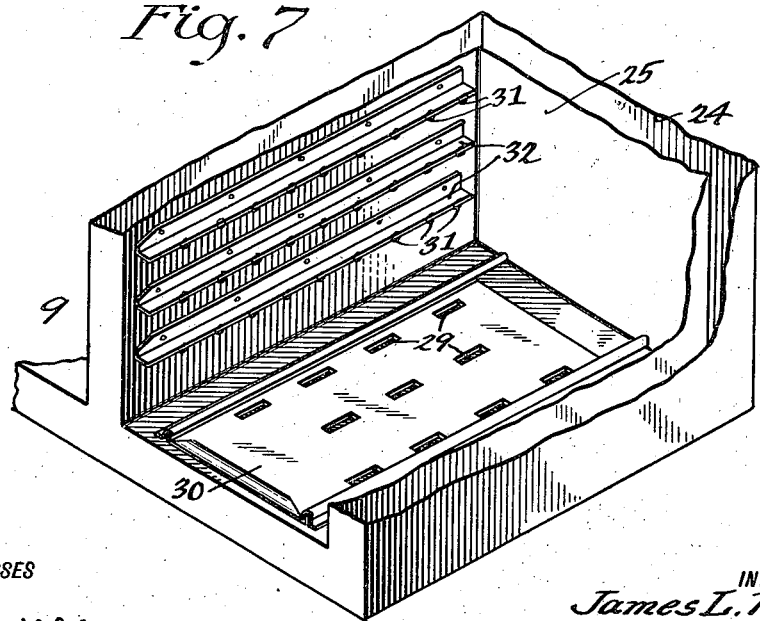
Fig. 7 is a fragmentary perspective of the evaporator.

The evaporator 9 comprises a galvanized iron casing 24, although I do not limit myself to any specific material, containing a plurality of compartments 25 opening through the front wall of the casing 24, as is clearly shown in Fig. 7, and provided, each, with a door 26 and suitable catches 27 therefor. The pipe branches 14 and 15 communicate directly with the interior of the casing 24 but not with the interiors of the compartments 25 except in a manner hereinafter pointed out and, by reference to Figs. 5 and 7, it will be seen that the heated air will surround the compartments on top, bottom, and three sides, thus assuring an even distribution of the heat over the exposed surfaces of the compartments.

The dampers 16 and 17 are shown as controlling only the branch pipes 15 adjacent the bottom of the casing 24, but I may also provide dampers for the upper branch pipes 14, if desired, and I will provide a damper 28 Figs. 2 and 3, for the air chamber 21 of the furnace and thus control the temperature of the air forced into the evaporator, this damper 28 not being shown in detail, as it may be of any desired type.

The bottoms of the compartments 25 are provided with holes 29 therethrough controlled by sliding dampers 30, whereby the heated air entering the bottoms of the compartments may be controlled, and I also provide a plurality of horizontal rows of perforations 31 in the side walls of the compartments to maintain a constant though relatively slight air communication between the exteriors and interiors of said compartments.

Each compartment is provided with a plurality of horizontally arranged, equidistant, supports 32 on each side of the interior thereof and serving as supports for removable trays 33 for the reception of the matter to be evaporated, these trays being arranged directly over the rows of perforations 31 in the side walls of the compartments whereby fresh heated air is supplied beneath the trays at all times, suitable ducts 34 being provided in the tops of the compartments for the escape of the cooled, moisture-laden, air from the compartments, and suitable dampers 35 being provided for said ducts.

My evaporator may be made of any number of compartments and of any desired size, the doors thereof being hollow to retain the heat within the compartments, and I may employ as many of the trays as may be found desirable according to the height of the evaporator.

The device yields a product of very high grade when used for drying copra, inasmuch as no smoke-laden air reaches the fresh kernels and no flames, only pure heated air coming in contact therewith and a constant supply of fresh heated air being assured.

As will be understood I do not limit myself to specific materials of which the device is constructed, nor to the exact structural details shown, except such as come within the scope of the following claims.

Having fully described my invention, what I claim as new, and desire to secure by Letters Patent, is:—

1. A device of the class described, comprising a casing divided into compartments the top, bottom, back and two side walls of each of which are separated from said casing, a door in the front of each compartment, a plurality of removable trays in each compartment, means for leading heated air to the interior of said casing around each compartment, means for leading said air to each compartment beneath each tray, and means for leading the air from the top of each compartment.

2. A device of the class described, comprising a casing divided into compartments the top, bottom, back and two side walls of each of which are separated from said casing, a door in the front of each compartment, means for leading heated air to the interior of said casing, a plurality of trays in each compartment, the walls of each compartment being perforated beneath each tray, and a controlled flue for each compartment.

3. A device of the class described, comprising a casing divided into compartments the top, bottom, back and two side walls of each of which are separated from said casing, and perforated along superimposed horizontal lines, tray supports above said lines of perforations, a tray on each set of supports, controlled means for leading air through the bottoms of said compartments, a door for each compartment, means for leading heated air to said casing and thence to said compartments, and means for controlling the escape of air from said compartments.

4. A device of the class described, comprising a casing divided into compartments the top, bottom, back and two side walls of each of which are separated from said casing, a door for each compartment, controllable means for leading heated air to said casing, controllable means for leading said air to said compartments, controllable means for leading the air from said compartments, and a plurality of superimposed trays in the path of the heated air through said compartments.

In testimony whereof I have signed my name to this specification in the presence of two subscribing witnesses.

JAMES LOUIS PIERCE.

Witnesses:
J. F. BOOMER,
H. MARTIN.